United States Patent
Chamarthy et al.

(10) Patent No.: US 11,341,135 B2
(45) Date of Patent: May 24, 2022

(54) OPTIMIZING JSON DOCUMENT USAGE

(71) Applicant: INTERNATIONAL BUSINESS MACHINES CORPORATION, Armonk, NY (US)

(72) Inventors: Ravi Chandra Chamarthy, Hyderabad (IN); Kishore Patel, Hasmathpet (IN)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 16/804,103

(22) Filed: Feb. 28, 2020

(65) Prior Publication Data

US 2021/0271678 A1  Sep. 2, 2021

(51) Int. Cl.
  *G06F 16/24* (2019.01)
  *G06F 16/2453* (2019.01)
  *G06F 16/21* (2019.01)
(52) U.S. Cl.
  CPC ...... *G06F 16/24549* (2019.01); *G06F 16/213* (2019.01)
(58) Field of Classification Search
  CPC .................................. G06F 16/24549
  See application file for complete search history.

(56) References Cited

U.S. PATENT DOCUMENTS

| | | | | |
|---|---|---|---|---|
| 9,348,896 B2* | 5/2016 | Faith | ............... | G06Q 20/4016 |
| 10,275,475 B2 | 4/2019 | Tsirogiannis | | |
| 11,281,695 B2* | 3/2022 | Narayanan | ............... | G06F 16/9024 |
| 2012/0203762 A1* | 8/2012 | Kakarlamudi | ............... | G06F 16/24542 |
| | | | | 707/718 |
| 2014/0279854 A1* | 9/2014 | Scanlon | ............... | G06F 16/162 |
| | | | | 707/609 |
| 2015/0026189 A1* | 1/2015 | Li | ............... | G06F 16/245 |
| | | | | 707/769 |
| 2015/0134692 A1* | 5/2015 | Agarwal | ............... | G06F 16/2455 |
| | | | | 707/769 |
| 2016/0314099 A1* | 10/2016 | Lin | ............... | G06F 40/103 |
| 2017/0091265 A1* | 3/2017 | Cao | ............... | G06F 16/211 |
| 2017/0103103 A1* | 4/2017 | Nixon | ............... | G06F 16/256 |
| 2017/0116307 A1 | 4/2017 | Kapoor | | |
| 2017/0169061 A1 | 6/2017 | Cao | | |
| 2017/0242667 A1* | 8/2017 | Kotman | ............... | G16B 50/00 |
| 2017/0286566 A1 | 10/2017 | Bornea | | |
| 2019/0102389 A1* | 4/2019 | LeGault | ............... | G06F 16/2246 |
| 2020/0233848 A1* | 7/2020 | Mathur | ............... | G06F 16/2282 |
| 2021/0042311 A1* | 2/2021 | Miller | ............... | G06F 16/24545 |

* cited by examiner

*Primary Examiner* — Mohammad S Rostami
(74) *Attorney, Agent, or Firm* — Schmeiser, Olsen & Watts; Stephanie Carusillo (57) ABSTRACT

An approach is provided for optimizing data fetching. A query employing a method to fetch data from a JSON document is received. An amount of time required to execute the query and a number of nested layers in a traversal of the JSON document required to fetch the data are determined. Based on the amount of time and the number of nested layers, a cost associated with an execution of the query is calculated. The cost is determined to exceed a threshold value. Responsive to the determination that the cost exceeds the threshold value and using historical query patterns and historical query execution times, a schema of the JSON document is re-designed. The data is fetched from the JSON document using the re-designed schema.

20 Claims, 3 Drawing Sheets

OPTIMIZING JSON DOCUMENT USAGE

BACKGROUND

The present invention relates to database management, and more particularly to optimizing a fetching of data in a JavaScript® Object Notation (JSON) document. JavaScript is a registered trademark of Oracle America, Inc. located in Redwood Shores, Calif.

NoSQL databases use JSON structures (i.e., JSON documents) as a data format to represent data. Complex applications such as banking, medical, order processing, supply chain, data integration, etc. can have complex data schemas with nested (i.e., multi-level) JSON structures. Data represented by JSON structures is transferred from one application to another based on the needs of the applications. For a given application use case, if the required data is nested inside JSON structures, code is written to fetch a JSON structure from an underlying repository in which the JSON structure is stored, load the fetched JSON structure into memory, and traverse through one or more levels of the JSON structure via a query to fetch the desired data.

SUMMARY

In one embodiment, the present invention provides a method of optimizing data fetching. The method includes receiving, by one or more processors, a query employing a method to fetch data from a JSON document. The method further includes determining, by the one or more processors, an amount of time required to execute the query and a number of nested layers in a traversal of the JSON document required to fetch the data. The method further includes based on the amount of time required to execute the query and the number of nested layers in the traversal required to fetch the data, calculating, by the one or more processors, a cost associated with an execution of the query. The method further includes determining, by the one or more processors, that the cost exceeds a threshold value. The method further includes responsive to the determining that the cost exceeds the threshold value and using historical query patterns and historical query execution times, re-designing, by the one or more processors, a schema of the JSON document. The method further includes fetching, by the one or more processors, the data from the JSON document using the re-designed schema of the JSON document.

In another embodiment, the present invention provides a computer program product which includes a computer readable storage medium having computer readable program code stored on the computer readable storage medium, the computer readable program code being executed by a central processing unit (CPU) of a computer system to cause the computer system to perform a method. The method includes the computer system receiving a query employing a method to fetch data from a JSON document. The method further includes the computer system determining an amount of time required to execute the query and a number of nested layers in a traversal of the JSON document required to fetch the data. The method further includes based on the amount of time required to execute the query and the number of nested layers in the traversal required to fetch the data, the computer system calculating a cost associated with an execution of the query. The method further includes the computer system determining that the cost exceeds a threshold value. The method further includes responsive to the determining that the cost exceeds the threshold value and using historical query patterns and historical query execution times, the computer system re-designing a schema of the JSON document. The method further includes the computer system fetching the data from the JSON document using the re-designed schema of the JSON document.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method. The method includes the computer system receiving a query employing a method to fetch data from a JSON document. The method further includes the computer system determining an amount of time required to execute the query and a number of nested layers in a traversal of the JSON document required to fetch the data. The method further includes based on the amount of time required to execute the query and the number of nested layers in the traversal required to fetch the data, the computer system calculating a cost associated with an execution of the query. The method further includes the computer system determining that the cost exceeds a threshold value. The method further includes responsive to the determining that the cost exceeds the threshold value and using historical query patterns and historical query execution times, the computer system re-designing a schema of the JSON document. The method further includes the computer system fetching the data from the JSON document using the re-designed schema of the JSON document.

DETAILED DESCRIPTION

Overview

Using known techniques to manage the fetching of data in NoSQL databases that employ JSON structure(s), if desired data is nested inside multiple levels of the JSON structure(s), complex functions and/or a significant amount of code is required to be written to traverse through the JSON structure(s) to fetch the desired data, which provides a direct negative impact on application performance. As more levels of a JSON structure need to be traversed, the complexity of the coding increases. Performance including response time is negatively affected because the application code is required to traverse through multiple levels of JSON nested structures or because the size of the JSON structure is significant. Excessive memory consumption is also an issue because of the size of the JSON structure in which the data is fetched and because the JSON structure resides in the application hosted server memory until the memory is garbage collected.

Embodiments of the present invention address the aforementioned unique challenges of managing the fetching of data by optimizing a design of JSON documents by generating suggestions regarding re-designing existing JSON documents or designing new JSON documents to improve application performance, where the re-designing or designing of the JSON documents is based on past querying patterns and query execution times to fetch the desired attributes from the JSON documents.

System for Optimizing Data Fetching in a JSON Document

Figure 1:
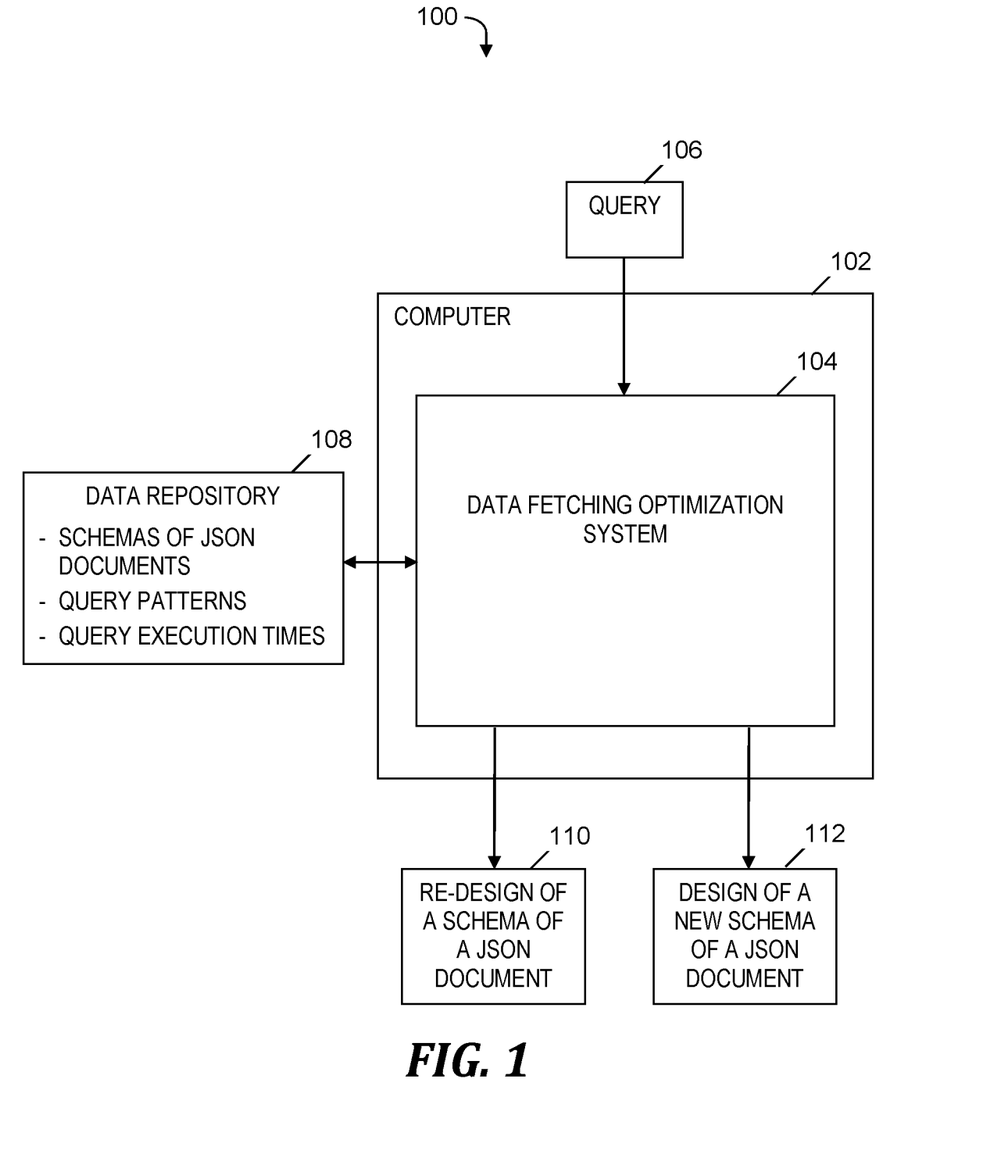
FIG. 1 is a block diagram of a system for optimizing data fetching in a JSON document, in accordance with embodiments of the present invention.

FIG. 1 is a block diagram of a system 100 for optimizing data fetching in a JSON document, in accordance with embodiments of the present invention. System 100 includes a computer 102, which executes a software-based data fetching optimization system 104. In one embodiment, computer 102 is operatively coupled via a computer network (not shown) with one or more computer devices (not shown) operated by respective one or more users.

Data fetching optimization system 104 receives a query 106 sent from a computing device operated by a user. Query 106 includes a method used in a software application to fetch data that resides in a JSON document. In one embodiment, query 106 includes a getter method to fetch the data in the JSON document. The computing device that sends query 106 can be computer 102 or another computing device (not shown). Data fetching optimization system 104 determines an amount of time needed to execute query 106 and a number of nested layers that are required to be traversed in a schema of the JSON document to fetch the data. Data fetching optimization system 104 determines a cost based on a combination of the aforementioned amount of time, the aforementioned number of nested layers, a size of the JSON document, and an amount of memory used to load the JSON document.

Data fetching optimization system 104 accesses data in a data repository 108, which is operatively coupled to computer 102. Data repository 108 is a persistent data store that includes schemas (also referred to herein as JSON schemas or JSON document schemas) of JSON documents and information specifying queries that have been executed against the schemas. In one embodiment, data repository 108 includes (1) JSON schemas, (2) query patterns, and (3) query execution times (i.e., response times). The JSON schemas stored in data repository 108 were the subject of previously executed queries to fetch data from the JSON documents. A given query pattern stored in data repository 108 specifies nested layers of a schema of a corresponding JSON document that is required to be traversed to fetch data in the JSON document as a result of executing the query associated with the query pattern. The schema of the corresponding JSON document is a schema stored in data repository 108. Query execution times stored in data repository 108 are amounts of time that are needed to complete executions of respective queries that fetch data via traversals of respective JSON schemas (i.e., JSON schemas stored in data repository 108). In other embodiments, data repository 108 includes the schemas, query patterns, and query execution times described above, and also includes sizes of the JSON documents, amounts of memory utilized to load the JSON documents, and/or amounts of data retrieved from the previously executed queries that fetched data from the JSON documents, where the JSON documents are specified by the schemas stored in data repository 108.

Based on the aforementioned cost and using the query patterns and the query execution times stored in data repository 108, data fetching optimization system 104 generates (i) a re-design 110 of the schema of the JSON document or (ii) a design 112 of a new schema of the JSON document. In one embodiment, data fetching optimization system 104 generates a suggestion that specifies the re-design 110 or the design 112 and sends the suggestion to a computing device operated by the user.

In one embodiment, data fetching optimization system 104 re-designs the schema of the JSON document according to re-design 110 or designs a new schema for the JSON document according to design 112. After the re-designing of the schema or the designing of the new schema, data fetching optimization system 104 fetches the data from the JSON document using the re-designed schema or the new schema, so that the performance of the query execution is improved (i.e., the query execution time is faster compared to executing the query without the re-design 110 of the schema and faster compared to executing the query without the new design 112).

Figure 2:
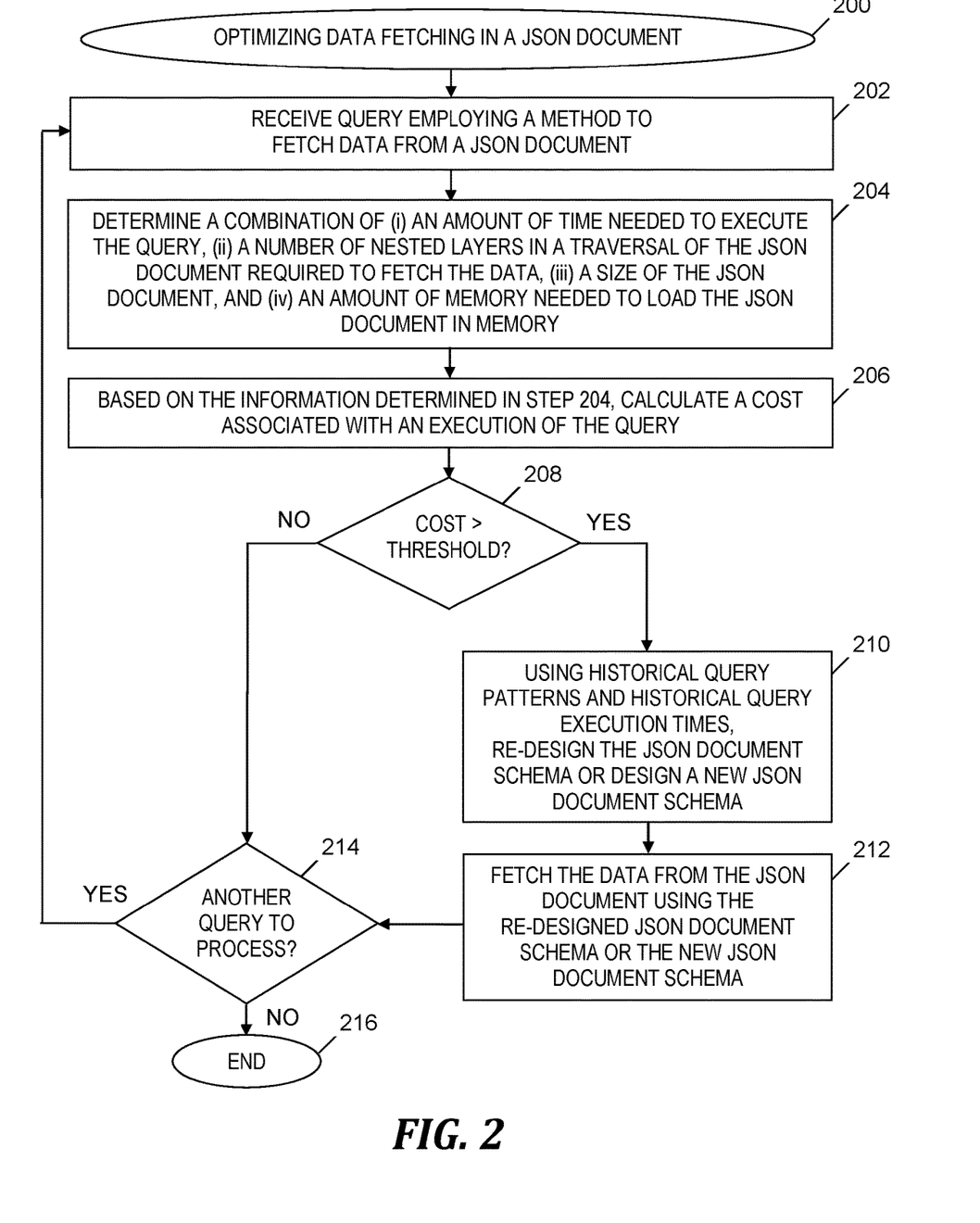
FIG. 2 is a flowchart of a process of optimizing data fetching in a JSON document, where the process is implemented in the system of FIG. 1, in accordance with embodiments of the present invention.
Figure 3:
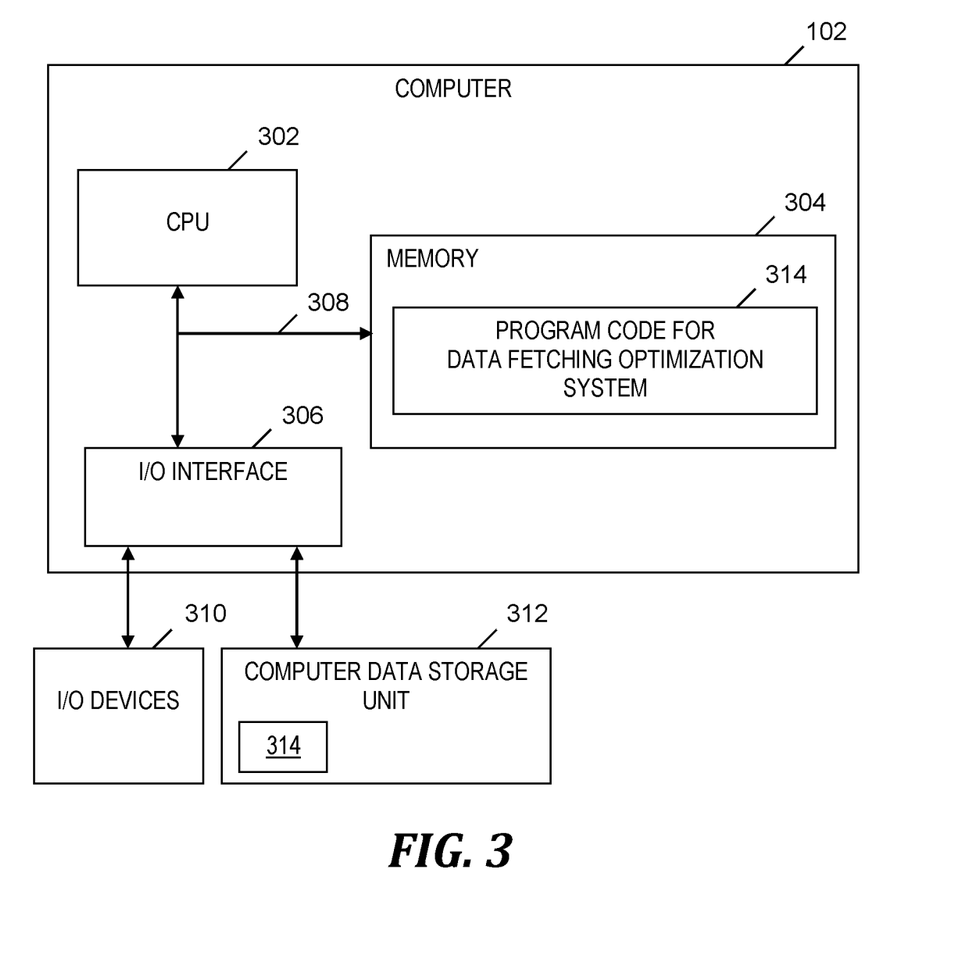
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Optimizing Data Fetching in a JSON Document

FIG. 2 is a flowchart of a process of optimizing data fetching in a JSON document, where the process is implemented in the system of FIG. 1, in accordance with embodiments of the present invention. The process of FIG. 2 starts at step 200. In one embodiment, prior to step 202, a computing device operated by a user sends query 106 (see FIG. 1) to computer 102 (see FIG. 1). In step 202, data fetching optimization system 104 (see FIG. 1) receives query 106 (see FIG. 1), which employs a method to fetch data from a JSON document.

In step 204, data fetching optimization system 104 (see FIG. 1) determines (i) an amount of time needed to execute query 106 (see FIG. 1) (i.e., query execution time) and (ii) a number of nested layers in a traversal of the JSON document, where the traversal is required to fetch the data. Alternatively, in step 204, data fetching optimization system 104 (see FIG. 1) determines (i) and (ii) listed above, together with (iii) a size of the JSON document and/or (iv) an amount of memory needed to load the JSON document in memory.

In step 206, based on the amount of time determined in step 204 and the number of nested layers determined in step 204, data fetching optimization system 104 (see FIG. 1) calculates a cost associated with an execution of query 106 (see FIG. 1) to fetch the data in the JSON document. Alternatively, based on a combination of: (i) the amount of time determined in step 204, (ii) the number of nested layers determined in step 204, (iii) a size of the JSON document, and (iv) an amount of memory needed to load the JSON document in memory, data fetching optimization system 104 (see FIG. 1) calculates a cost associated with an execution of query 106 (see FIG. 1) to fetch the data in the JSON document. In one embodiment, data fetching optimization system 104 (see FIG. 1) assigns weights to items (i), (ii), (iii), and (iv) listed above and the calculation of the cost is based in part on the assigned weights.

In step 208, data fetching optimization system 104 (see FIG. 1) determines whether the cost calculated in step 206 exceeds a threshold value. In one embodiment, data fetching optimization system 104 (see FIG. 1) receives the threshold value prior to step 208.

If data fetching optimization system 104 (see FIG. 1) determines in step 208 that the cost calculated in step 206 exceeds the threshold value, then the Yes branch of step 208 is followed and step 210 is performed.

Prior to step 210, data fetching optimization system 104 (see FIG. 1) retrieves historical query patterns from data repository 108 (see FIG. 1), where the retrieved query patterns are associated with schemas stored in data repository 108 (see FIG. 1), and where the schemas match the schema of the JSON document. Alternatively, the retrieved query patterns are associated with types of JSON documents, where the types match the type of the JSON document. In one embodiment, the type of a JSON document is a description of a business function that includes fetching data from the JSON document (e.g., the type of JSON document XYZ is order processing).

In step 210, using one of the retrieved historical query patterns, data fetching optimization system 104 (see FIG. 1) generates a re-design 110 (see FIG. 1) of the schema of the JSON document. For example, the re-design 110 (see FIG. 1) may specify a structure of the JSON document that is a flat structure or a structure that has fewer nested layers than the current nested layer structure of the JSON document (i.e., a re-designed structure that is less complex than the structure of the JSON document prior to the re-design). Step 210 also includes data fetching optimization system 104 (see FIG. 1) determining a cost of executing the query 106 (see FIG. 1) to fetch data in a re-designed version of the JSON document (i.e., the JSON document having the re-design 110 (see FIG. 1)). The cost determined in step 210 is calculated in the same way that cost was calculated in step 206. If the cost determined in step 210 is less than the cost determined in step 206, the re-design 110 causes a decrease in one or more of the following: the query execution time, the number of nested layers traversed, the size of the JSON document, and the amount of memory needed to load the JSON document.

Data fetching optimization system 104 (see FIG. 1) checks if the cost determined in step 210 exceeds the aforementioned threshold. If the cost exceeds the threshold, data fetching optimization system 104 (see FIG. 1) repeats step 210 using another historical query pattern retrieved from the data repository 108 (see FIG. 1) until the cost does not exceed the aforementioned threshold. In one embodiment, data fetching optimization system 104 (see FIG. 1) spawns threads that performs the iterations of step 210 described above.

In step 212, data fetching optimization system 104 (see FIG. 1) fetches the data from the JSON document by using the re-designed schema of the JSON document.

In one embodiment, data fetching optimization system 104 (see FIG. 1) generates a suggestion that specifies the re-design 110 (see FIG. 1) and sends the suggestion to the computing device that sent query 106 (see FIG. 1) to computer 102 (see FIG. 1). In one embodiment, data fetching optimization system 104 (see FIG. 1) receives from the aforementioned computing device a user authorization of an implementation of the suggestion, and step 212 is performed in response to receiving the user authorization.

In one embodiment, prior to step 210, data fetching optimization system 104 (see FIG. 1) determines that a complexity of the schema of the JSON document for fetching the data exceeds a threshold amount of complexity. In response to the determination that the complexity of the schema exceeds the threshold amount, data fetching optimization system 104 (see FIG. 1) in an alternate to step 210 designs a new schema for the JSON document according to design 112 (see FIG. 1), which is based on the retrieved historical query patterns and historical query execution times. The new schema is designed so that the cost of executing the query 106 (see FIG. 1) to fetch data in the JSON document specified by the new schema having design 112 (see FIG. 1) does not exceed the aforementioned threshold. In an alternate to step 212, data fetching optimization system 104 (see FIG. 1) fetches the data from the JSON document by using the new schema that was designed according to design 112 (see FIG. 1).

In step 214, data fetching optimization system 104 (see FIG. 1) determines whether there is another query to process. If data fetching optimization system 104 (see FIG. 1) determines in step 214 that there is another query to process, then the Yes branch of step 214 is followed and the process loops to step 202. If data fetching optimization system 104 (see FIG. 1) determines in step 214 that there is not another query to process, then the No branch of step 214 is followed and the process of FIG. 2 ends at step 216.

Returning to step 208, if data fetching optimization system 104 (see FIG. 1) determines that the cost does not exceed the threshold value, then the No branch of step 208 is followed and step 214 is performed, as described above.

Computer System

FIG. 3 is a block diagram of a computer included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for data fetching optimization system 104 (see FIG. 1) to perform a method of optimizing data fetching in a JSON document, where the instructions are executed by CPU 302 via memory 304. CPU 302 may include a single processing unit or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 304 and/or storage unit 312 may store computer program code 314 that includes instructions that are executed by CPU 302 via memory 304 optimize data fetching in a JSON document. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

In one embodiment, computer data storage unit 312 includes data repository 108 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing data fetching in a JSON document. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to optimize data fetching in a JSON document. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing data fetching in a JSON document.

While it is understood that program code 314 for optimizing data fetching in a JSON document may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing data fetching in a JSON document. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing data fetching, the method comprising:

receiving, by one or more processors, a query employing a method to fetch data from a JavaScript Object Notation (JSON) document;

determining, by the one or more processors, an amount of time required to execute the query and a number of nested layers in a traversal of the JSON document required to fetch the data;

based on the amount of time required to execute the query and the number of nested layers in the traversal required to fetch the data, calculating, by the one or more processors, a cost associated with an execution of the query; determining, by the one or more processors, that the cost exceeds a threshold value;

responsive to the determining that the cost exceeds the threshold value and using historical query patterns and historical query execution times, re-designing, by the one or more processors, a schema of the JSON document; and fetching, by the one or more processors, the data from the JSON document using the re-designed schema of the JSON document.

2. The method of claim 1, further comprising:

receiving, by the one or more processors, a second query employing the method or another method to fetch data from a second JSON document;

determining, by the one or more processors, an amount of time required to execute the second query and a number of nested layers in a traversal of the second JSON document required to fetch the data from the second JSON document;

based on the amount of time required to execute the second query and the number of nested layers in the traversal required to fetch the data from the second JSON document, calculating, by the one or more processors, a cost associated with an execution of the second query;

determining, by the one or more processors, that the cost associated with the execution of the second query exceeds the threshold value;

responsive to the determining that the cost associated with the execution of the second query exceeds the threshold value, determining, by the one or more processors, that a complexity of a schema of the second JSON document exceeds a complexity threshold;

responsive to the determining that the complexity of the schema of the second JSON document exceeds the complexity threshold and using the historical query patterns and the historical query execution times, designing, by the one or more processors, a new schema of the second JSON document; and fetching, by the one or more processors, the data from the second JSON document using the new schema of the second JSON document.

3. The method of claim 1, further comprising:

generating, by the one or more processors, a recommendation for fetching the data using the re-designed schema of the JSON document;

receiving, by the one or more processors, an acceptance of the recommendation from a computing device operated by a user, wherein the fetching the data from the JSON document is performed in response to the receiving the acceptance of the recommendation.

4. The method of claim 1, wherein the fetching the data from the JSON document using the re-designed schema is performed more quickly than a fetch of the data from JSON document using the schema of the JSON document prior to the re-designing the schema.

5. The method of claim 1, wherein the fetching the data from the JSON document using the re-designed schema avoids a fetch of additional data that is included in an execution of the query using the schema of the JSON document prior to the re-designing the schema.

6. The method of claim 1, further comprising:

prior to the receiving the query, storing, in a data repository and by the one or more processors, the schema of the JSON document;

prior to the receiving the query, storing, in the data repository and by the one or more processors, queries that were previously executed to fetch data items from the JSON document;

prior to the receiving the query, storing, in the data repository and by the one or more processors, execution times of the queries;

prior to the receiving the query, storing, in the data repository and by the one or more processors, paths used by the queries to traverse the JSON document to fetch the data items; and subsequent to receiving the query, retrieving, by the one or more processors, the stored schema, queries, execution times, and paths, wherein the re-designing the schema of the JSON document is based on the retrieved schema, queries, execution times, and paths.

7. The method of claim 1, wherein the fetching the data from the JSON document using the re-designed schema traverses a number of layers in the re-designed schema that is less than a number of layers traversed in an original schema of the JSON document for a fetch of the data from the JSON document prior to the re-designing the schema.

8. The method of claim 1, further comprising:

providing at least one support service for at least one of creating, integrating, hosting, maintaining, and deploying computer readable program code in the computer, the program code being executed by a processor of the computer to implement the receiving the query, determining the amount of time required to execute the query and the number of nested layers in the traversal of the JSON document required to fetch the data, calculating the cost associated with the execution of the query, determining that the cost exceeds the threshold value, re-designing the schema of the JSON document, and fetching the data from the JSON document using the re-designed schema.

9. A computer program product comprising:

a computer readable storage medium having computer readable program code stored on the computer readable storage medium, the computer readable program code being executed by a central processing unit (CPU) of a computer system to cause the computer system to perform a method comprising the steps of:

the computer system receiving a query employing a method to fetch data from a JavaScript Object Notation (JSON) document;

the computer system determining an amount of time required to execute the query and a number of nested layers in a traversal of the JSON document required to fetch the data;

based on the amount of time required to execute the query and the number of nested layers in the traversal required to fetch the data, the computer system calculating a cost associated with an execution of the query;

the computer system determining that the cost exceeds a threshold value;

responsive to the determining that the cost exceeds the threshold value and using historical query patterns and historical query execution times, the computer system re-designing a schema of the JSON document; and the computer system fetching the data from the JSON document using the re-designed schema of the JSON document.

10. The computer program product of claim 9, wherein the method further comprises:

the computer system receiving a second query employing the method or another method to fetch data from a second JSON document;

the computer system determining an amount of time required to execute the second query and a number of nested layers in a traversal of the second JSON document required to fetch the data from the second JSON document;

based on the amount of time required to execute the second query and the number of nested layers in the traversal required to fetch the data from the second JSON document, the computer system calculating a cost associated with an execution of the second query;

the computer system determining that the cost associated with the execution of the second query exceeds the threshold value;

responsive to the determining that the cost associated with the execution of the second query exceeds the threshold value, the computer system determining that a complexity of a schema of the second JSON document exceeds a complexity threshold;

responsive to the determining that the complexity of the schema of the second JSON document exceeds the complexity threshold and using the historical query patterns and the historical query execution times, the computer system designing a new schema of the second JSON document; and the computer system fetching the data from the second JSON document using the new schema of the second JSON document.

11. The computer program product of claim 9, wherein the method further comprises:

the computer system generating a recommendation for fetching the data using the re-designed schema of the JSON document;

the computer system receiving an acceptance of the recommendation from a computing device operated by a user, wherein the fetching the data from the JSON document is performed in response to the receiving the acceptance of the recommendation.

12. The computer program product of claim 9, wherein the fetching the data from the JSON document using the re-designed schema is performed more quickly than a fetch of the data from JSON document using the schema of the JSON document prior to the re-designing the schema.

13. The computer program product of claim 9, wherein the fetching the data from the JSON document using the re-designed schema avoids a fetch of additional data that is included in an execution of the query using the schema of the JSON document prior to the re-designing the schema.

14. The computer program product of claim 9, wherein the method further comprises:
   prior to the receiving the query, the computer system storing in a data repository the schema of the JSON document;
   prior to the receiving the query, the computer system storing in the data repository queries that were previously executed to fetch data items from the JSON document;
   prior to the receiving the query, the computer system storing in the data repository execution times of the queries;
   prior to the receiving the query, the computer system storing in the data repository paths used by the queries to traverse the JSON document to fetch the data items; and
   subsequent to receiving the query, the computer system retrieving the stored schema, queries, execution times, and paths,
   wherein the re-designing the schema of the JSON document is based on the retrieved schema, queries, execution times, and paths.

15. A computer system comprising:
   a central processing unit (CPU);
   a memory coupled to the CPU; and
   a computer readable storage medium coupled to the CPU, the computer readable storage medium containing instructions that are executed by the CPU via the memory to implement a method comprising the steps of:
   the computer system receiving a query employing a method to fetch data from a JavaScript Object Notation (JSON) document;
   the computer system determining an amount of time required to execute the query and a number of nested layers in a traversal of the JSON document required to fetch the data;
   based on the amount of time required to execute the query and the number of nested layers in the traversal required to fetch the data, the computer system calculating a cost associated with an execution of the query;
   the computer system determining that the cost exceeds a threshold value; responsive to the determining that the cost exceeds the threshold value and using historical query patterns and historical query execution times, the computer system re-designing a schema of the JSON document; and
   the computer system fetching the data from the JSON document using the re-designed schema of the JSON document.

16. The computer system of claim 15, wherein the method further comprises:
   the computer system receiving a second query employing the method or another method to fetch data from a second JSON document;
   the computer system determining an amount of time required to execute the second query and a number of nested layers in a traversal of the second JSON document required to fetch the data from the second JSON document;
   based on the amount of time required to execute the second query and the number of nested layers in the traversal required to fetch the data from the second JSON document, the computer system calculating a cost associated with an execution of the second query;
   the computer system determining that the cost associated with the execution of the second query exceeds the threshold value;
   responsive to the determining that the cost associated with the execution of the second query exceeds the threshold value, the computer system determining that a complexity of a schema of the second JSON document exceeds a complexity threshold;
   responsive to the determining that the complexity of the schema of the second JSON document exceeds the complexity threshold and using the historical query patterns and the historical query execution times, the computer system designing a new schema of the second JSON document; and
   the computer system fetching the data from the second JSON document using the new schema of the second JSON document.

17. The computer system of claim 15, wherein the method further comprises:
   the computer system generating a recommendation for fetching the data using the re-designed schema of the JSON document;
   the computer system receiving an acceptance of the recommendation from a computing device operated by a user, wherein the fetching the data from the JSON document is performed in response to the receiving the acceptance of the recommendation.

18. The computer system of claim 15, wherein the fetching the data from the JSON document using the re-designed schema is performed more quickly than a fetch of the data from JSON document using the schema of the JSON document prior to the re-designing the schema.

19. The computer system of claim 15, wherein the fetching the data from the JSON document using the re-designed schema avoids a fetch of additional data that is included in an execution of the query using the schema of the JSON document prior to the re-designing the schema.

20. The computer system of claim 15, wherein the method further comprises:
   prior to the receiving the query, the computer system storing in a data repository the schema of the JSON document;
   prior to the receiving the query, the computer system storing in the data repository queries that were previously executed to fetch data items from the JSON document;
   prior to the receiving the query, the computer system storing in the data repository execution times of the queries;
   prior to the receiving the query, the computer system storing in the data repository paths used by the queries to traverse the JSON document to fetch the data items; and
   subsequent to receiving the query, the computer system retrieving the stored schema, queries, execution times, and paths, wherein the re-designing the schema of the JSON document is based on the retrieved schema, queries, execution times, and paths.

\* \* \* \* \*